Sept. 22, 1925.
A. A. HUNTUS
NET NEEDLE
Filed April 21, 1925
1,554,729
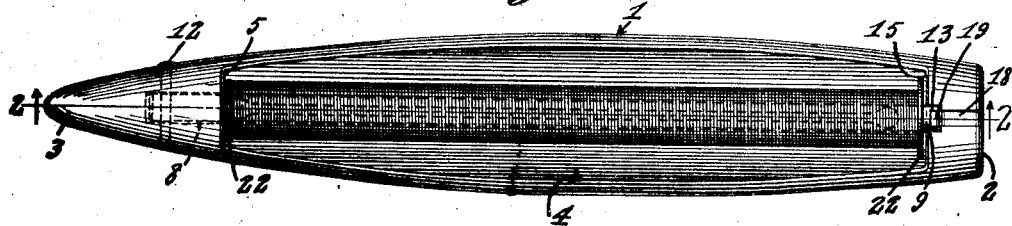
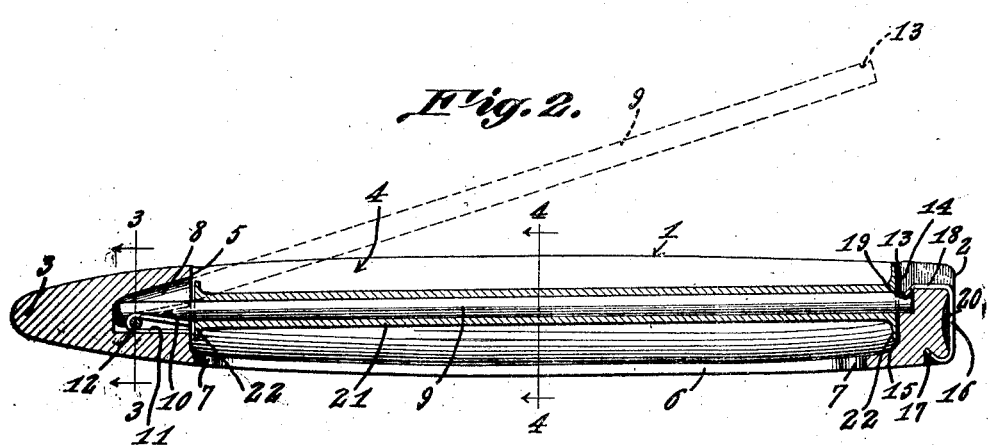
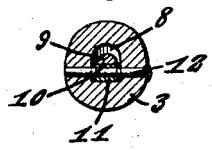
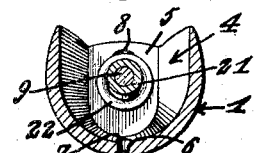
A. A. Huntus, INVENTOR.
BY
Geo. P. Kimmel, ATTORNEY.

Patented Sept. 22, 1925.

1,554,729

UNITED STATES PATENT OFFICE.

ANTTI ALFRED HUNTUS, OF ASTORIA, OREGON.

NET NEEDLE.

Application filed April 21, 1925. Serial No. 24,817.

*To all whom it may concern:*

Be it known that I, ANTTI ALFRED HUNTUS, a citizen of the United States, residing at Astoria, in the county of Clatsop and State of Oregon, have invented certain new and useful Improvements in Net Needles, of which the following is a specification.

This invention relates to the class of knitting and netting devices and pertains particularly to a needle or shuttle for use in the making of fish nets.

The primary object of this invention is the provision, in a manner as hereinafter set forth, of a net needle or shuttle having means whereby a spool of cord may be placed therein and passed therefrom in a convenient and easy manner during the net making process.

Another object of the invention is the provision, in a manner as hereinafter set forth, of a net needle or shuttle having a hollow body and further having spring controlled supporting means therein upon which a spool of cord may be easily and quickly placed to be fed from the shuttle as the net making process proceeds, the said spool of cord being housed within the shuttle and completely protected from frictional engagement with the net or with the user's hand.

It is well known that in the manufacture of fishing nets by hand, as at present practiced, there is used a long flat needle having a longitudinally extending opening therein and further having a flexible tongue extending lengthwise of this opening over which tongue the cord to be woven into the net is wound. When these needles are filled with cord they are bulky and cumbersome, difficult to manage in passing back and forth through the net meshes, and the cord is subject to much wear through constant frictional contact with the net and the hands of the user and thereby materially weakened before even being placed in use, for the purpose of which intended.

In the device embodying this invention, there is provided an elongated body tapering at one end to a point and this body is hollowed to provide a shell or case having an open side and further having a longitudinally extending slit through the opposite side thereof. Extending longitudinally through this shell or casing is a tongue member one end of which is fitted into the body of the shuttle and is controlled by a spring in such a manner that when the other end is released it will rise from the shell and extend outwardly therefrom at an angle. Upon this tongue a spool wound with netting cord is slipped and the tongue is pressed down and secured into position within the shell, and the cord from the spool is passed through the slot at the back of the shell through which it is fed during the netting process.

In the use of netting needles of the type first described, it is necessary that the net maker have dozens of these needles on hand, for the filling thereof with cord is a tedious process and therefore it is necessary that a great number of these filled needles be at hand while making a net. In applicant's device the same needle may be used throughout the making of a net and it is only necessary to have a number of filled spools at hand and as soon as one spool has been emptied it can be removed and the filled one immediately inserted into position. The expense of having a great number of needles is thereby eliminated and besides the cord is fed out steadily from a shuttle of the character embodying this invention, and the amount as let out can be easily regulated and adjusted as desired whereas in the use of the old type of netting needles the cord or twine is fed out in portions and working with an old fashion needle is therefore a jerky and erratic process.

A further and final object of this invention is the provision, in a manner as hereinafter set forth, of an improved type of netting needle or shuttle which will be light and easily handled, of a design which will make the use thereof simple, strong and durable, and inexpensive to manufacture.

The invention will be best understood from a consideration of the following detailed description taken in connection with the accompanying drawing forming a part of this specification, with the understanding however, that the invention is not confined to any strict conformity with the showing of the drawings, but may be changed and modified so long as such changes and modifications mark no material departure from the salient features of the invention as expressed in the appended claims.

In the drawing:—

Figure 1 is a top plan view of the device embodying this invention showing the spool positioned therein as filled with netting twine or cord.

Figure 2 is a central longitudinal sectional view taken upon the line 2—2 of Figure 1, the spool here shown being emptied of cord.

Figure 3 is a transverse section taken upon the line 3—3 of Figure 2, and

Figure 4 is a transverse section taken upon the line 4—4 of Figure 2.

Referring now to the drawing in detail wherein like numerals of reference indicate corresponding parts throughout the several views, the numeral 1 indicates generally the device embodying this invention. It will be seen that this needle comprises an elongated body of material, of greatest width at its central portion and tapering slightly toward the rear thereof, and being cut square across at the rear as indicated at 2. The forward end tapers to a sharper point to set up the nose 3.

The body 1 is substantially circular in cross sections and has one side slightly flattened, and the body is cut in from this flattened side and hollowed out to provide the shell or casing 4. This hollowed out portion or shell portion 4 has the end walls 5 thereof substantially vertical or in other words at right angles to the longitudinal center of the body and the casing extends to a point adjacent the rear of the body and into the rear of the nose thereof as shown. Diametrically opposite to the open side of the shell or casing 4, the body is provided with the longitudinally extending slot 6, which slot is relatively narrow intermediate its end but is, at each end thereof, enlarged as at 7 to provide for the easy passage of the thread through the slot.

Cut into the nose 3 of the body from the wall 5 is a cavity 8 the floor of which is substantially parallel with the longitudinal center of the body and the top of which extends upwardly from the inner end towards the outer portion thereof as shown.

Into this cavity 8 there is adapted to extend one end of an elongated tongue member 9, the end of which tongue member which extends into the cavity being notched as at 10 to fit over the curved rear portion of a spring member 11 which spring is held in position by and has passed between the legs thereof the pin 12 which extends through the nose 3 of the body as shown. As shown also one leg of the spring 11 rests upon the bottom of the cavity and the other leg is held down by the tongue 9, into the notch 10 of which this leg fits. Into this notch 10 the spring acts to hold the tongue 9 in the cavity 8 so long as the pin 12 is in position. The other or free end of the tongue 9 is provided with a notch 13, and this notched end 13 is adapted to ride along a vertical slot 14 which is formed in the rear wall 15 of the casing 4 as shown in Figure 2.

Extending across the rear 2 of the body is a spring attached member 16, the lower end 17 of which is embedded in the body as shown, and the upper end is extended through the passage 18 into the slot 14 and is downturned to provide the spring finger 19 which engages the notch 13 of the tongue 9 when the same is down, to hold the tongue in position longitudinally of the casing 4. A recess 20 is formed in the back wall 2 of the body to enable the user to obtain a hold upon the spring 16 to retract the tongue 19 for the release of the tongue 9.

In the use of this device there are provided metallic spools 21 having the flanged ends 22, and these spools are filled with the netting cord used and when so filled are slipped over the tongue 9 and the tongue is then pressed downwardly and secured into position longitudinally of the casing 4. When in this position the spool of cord is entirely within the casing and protected, and the end of the cord is passed through one of the openings 7, so that the cord can pass back and forth through the slot 6 as it is being unwound from the spool.

In view of the foregoing description it will be readily seen that there has been provided a new and novel netting needle or shuttle of a design which will be much easier to use, and therefore enable the user to produce a net of better construction than has heretofore been produced.

Having thus described my invention what I claim is.

1. In a netting needle of the character set forth, a tapering body formed to provide a casing, a shiftable tongue extending longitudinally of and within said casing, and means controlling said tongue whereby the same, when released, will have one end raised from the casing to receive thereon a spool of twine.

2. In a netting needle of the character set forth, a tapering body formed to provide an open casing, and releasable means within said casing whereby an empty twine spool will be caused to be raised therefrom for replacement by a filled spool.

3. In a netting needle of the character set forth, an elongated tapering open shell body having a nose at one end, a tongue member extending longitudinally within said shell and having one end extended into said nose, shiftable means for holding the other end of said tongue, and means whereby said held end, when released, will be raised from said shell for the removal or application of a twine spool.

4. In a netting needle of the character set forth, an elongated tapering open shell body having a nose at one end, a tongue member extending longitudinally within said shell and having one end extended into said nose, a spring member within said nose engaging beneath said tongue, and means at the other end of said body for normally holding said end down, said spring, upon the release of said holding means, acting to cause said other end to swing upwardly from said shell for the application or removal of a twine spool to, or from, said tongue.

5. In a netting needle of the character set forth, an elongated tapering open shell body having a nose at one end, a tongue member extending longitudinally within said shell and having one end extended into said nose, a spring member within said nose engaging beneath said tongue, and means at the other end of said body for normally holding said end down, said spring, upon the release of said holding means, acting to cause said other end to swing upwardly from said shell for the application or removal of a twine spool to, or from, said tongue, said body having a longitudinally extending slot therein opposite the open side thereof for the passage of a netting cord wound on said spool.

In testimony whereof, I affix my signature hereto.

ANTTI ALFRED HUNTUS.